United States Patent [19]
Pearl et al.

[11] 3,776,074
[45] Dec. 4, 1973

[54] TRANSFER APPARATUS FOR AN AUTOMATED TOOL CARRIAGE

[75] Inventors: David R. Pearl; Lawrence S. Wolfson, both of West Hartford, Conn.

[73] Assignee: Gerber Garment Technology, Inc., East Hartford, Conn.

[22] Filed: Aug. 2, 1972

[21] Appl. No.: 277,477

[52] U.S. Cl............... 83/71, 83/563, 83/746, 83/701, 83/859, 83/925 CC, 104/48
[51] Int. Cl.................. A41h 43/00, B26d 1/10
[58] Field of Search................. 83/71, 746, 781, 83/553, 563, 701, 925 CC, 859; 104/48, 49, 50

[56] References Cited
UNITED STATES PATENTS
1,686,742  10/1928  Fox ............................ 104/50 UX
3,626,796  12/1971  Pearl............................ 83/563 X

Primary Examiner—J. M. Meister
Attorney—John C. Linderman

[57] ABSTRACT

A transfer table is provided for transferring an automatically controlled cutting tool carriage and the cutting tool from one cutting table to another so that the same tool can be utilized on a plurality of cutting tables. The transfer table engages a cutting table so that the tool carriage can be driven or rolled off of one cutting table onto the transfer table and transported to another cutting table on which the cutting tool is to be operated. The transfer table is provided with a latch mechanism for securing the tool carriage on the transfer table during the transferring operation and may also include a mechanical catch which assists in holding mechanical and electrical limit stops on the cutting tables inoperative whenever the tool carriage is driven on or off of the transfer table. A lock mechanism may be used to hold the cutting and transfer tables together when the tool carriage is not latched in the travelling position. For cutting systems in which the tool carriage and cutting tool are operated from a central computer by means of overhead cabling, a cable support boom may be connected to the transfer table to carry a segment of the cabling during the transfer operation.

29 Claims, 12 Drawing Figures

TRANSFER APPARATUS FOR AN AUTOMATED TOOL CARRIAGE

BACKGROUND OF THE INVENTION

The present invention relates to automated tool systems in which a tool and tool carriage can be removed from or transferred onto a work table on which the tool and carriage operate. More particularly, the invention is directed to apparatus which permits a tool and carriage to be transferred between or shared by two or more work tables without disassembling and reassembling the tool and carriage each time a different work table is used.

The economies realized by the use of numerically controlled cutting tools which travel back and forth over a work table have led to the acceptance of such tools in many different fields. In the garment industry, numerically controlled cutters produce large quantities of pattern pieces with greater accuracy than that provided by manual cutters and in the same or shorter periods of time. Savings are recognized by increasing the quantity of accuracy of the cut pattern pieces and decreasing the fabric material utilized to prepare the pieces.

Because of the speed with which automated cutting tools operate, a large portion of the production process may be devoted to setting up a cutting table with a fabric layup before the cutting tool is utilized. Also, after the cutting tool has been run through the material, the pattern pieces must be bundled or tied and removed from the cutting table before another layup of material is spread. Because the amount of time associated with setting up and clearing a cutting table is significant relative to the operating time of the tool, the practice of employing a single tool and tool carriage on several different cutting tables is now commonly known. For example, a single tool and tool carriage operated by a stationary control computer may be shared by three different cutting tables. When two of the tables are being spread with material or being cleared of previously cut pattern pieces, the cutting tool is operated on the third table. By interchanging the cutting tool with the several tables, the productive time of a single cutting tool is multiplied.

Since the initial cost of automated systems is substantial, the use of automated equipment may be prohibitive unless the cost of the equipment is readily recovered. The use of a plurality of work tables with a single tool, tool carriage and control computer permits the cost recovery to be realized more easily by multiplying the production rate and limiting the duplicated portions of the system, namely the work tables, to the less expensive components.

The use of a single cutting tool with a plurality of cutting tables is, therefore, highly desirable. Such use requires that the apparatus for transferring the tool and tool carriage and the interconnecting components of the cutting tables cooperate to facilitate the transfer operation.

It is, accordingly, a general object of the present invention to disclose a transfer apparatus for moving an automated work tool between several work tables.

SUMMARY OF THE INVENTION

The present invention resides in a transfer table and the combination of the table and an automated tool system. The transfer table for carrying a tool and a tool carriage from a work table is comprised of a structural support frame and a set of wheels connected to the frame for moving the table over a floor or a set of rails which lead between several work tables. A set of ways corresponding with ways on the work table are mounted in spaced relationship on the structural frame of the transfer table and extend to the periphery of the frame for registration in a continuous manner with the ways of the work table when the transfer table is placed in its transfer position adjacent the work table. The ways therefore provide a continuous support between the transfer and work tables so that the tool carriage can be driven or pushed directly off of the work table onto the transfer table. In one embodiment of the invention jacking means for variably positioning the transfer table are connected to the support frame for tilting the ways of the table between the transfer or loading position at which the sets of ways on the two tables are in contact and a travelling position in which the ways are spaced from one another to permit unimpeded movement of the transfer table toward and away from the work table. In another embodiment, the support frame is shifted relative to a mobile chassis in a direction parallel to the ways to engage the ways of the work table.

An overhead support boom may be connected to the work table for holding the cabling connecting the tool and tool carriage to a control computer. The boom supports a segment of the cabling so that the cabling moves together with the tool and carriage during the transfer operation.

DESCRIPTION OF THE PREFERRED EMBODIMENTS

Figure 1:
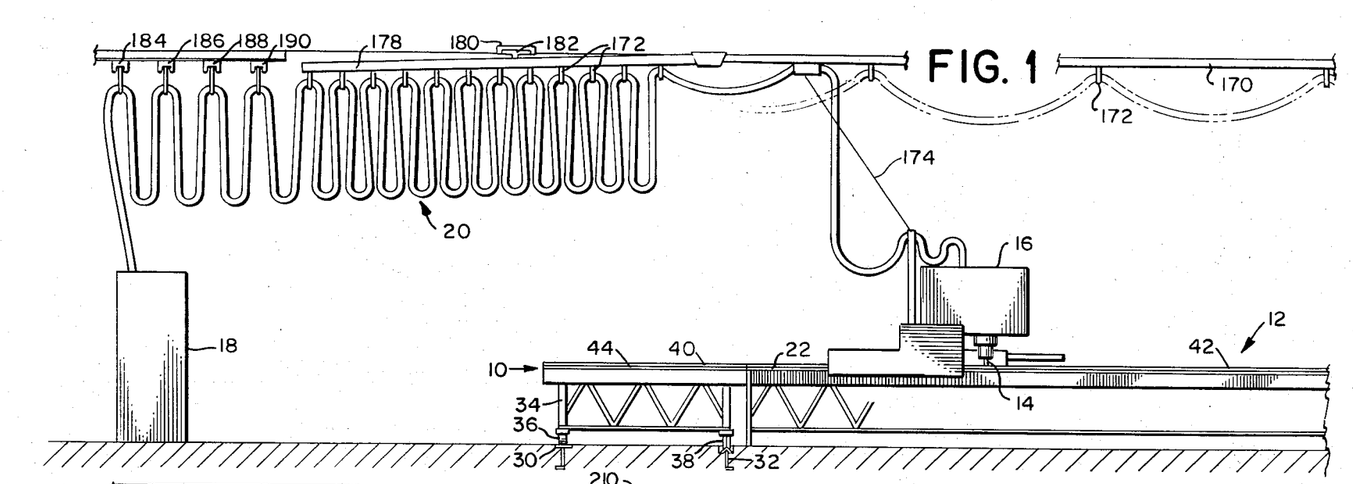
FIG. 1 is a side elevation view of a cutting system installation which utilizes the transfer table of the present invention.
Figure 2:
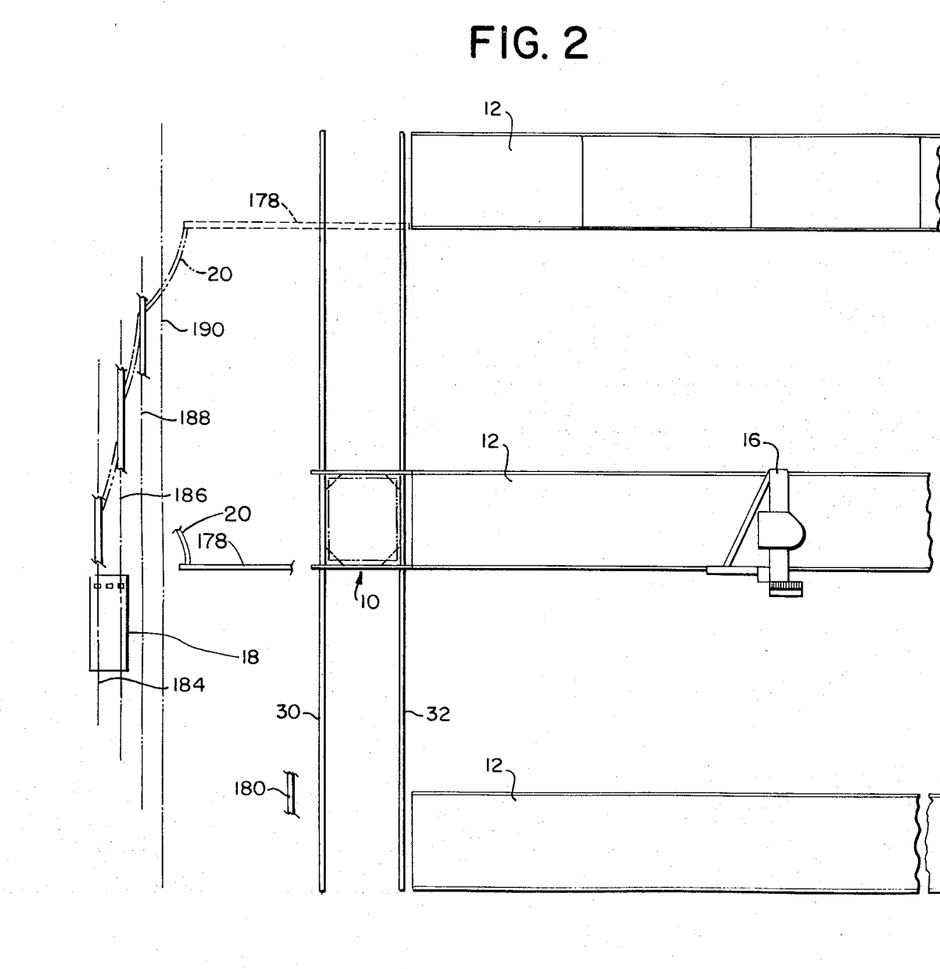
FIG. 2 is a plan view of the cutting system installation in FIG. 1 and shows the relative positioning of several cutting tables.

FIGS. 1 and 2 show a transfer table, embodying the present invention and generally designated 10, in a cutting system installation. The cutting system is comprised principally of a plurality of cutting tables 12 on which sheet material is spread, a cutting tool 14, such as a reciprocating knife which is used to cut material on each table 12, a tool carriage 16 for supporting and translating the tool 14 over each table 12, a control computer 18 and overhead cabling 20 connecting the control computer 18 with the tool 14 and the carriage 16. The cutting system illustrated is designed for cutting pattern pieces from a layup of fabrics which are spread on the upper or work surfaces of the tables 12; however, the present invention may be employed in other automated tool systems in which a work tool is automatically positioned on a work table by a control computer. The control computer 18 derives command signals from a program tape and transmits control signals through the cabling 20 to the tool 14 and carriage 16 to control the motions of the tool and carriage transversely and longitudinally over the horizontal work surfaces of the tables 12. In the case illustrated wherein the cutting tool is a reciprocating knife, the work surface of a cutting table 12 is formed by the upper surface of a penetrable bed formed, for example by a material such as styrofoam or bristled mats, so that the knife can cut through the layup of fabric material and into the penetrable bed as the knife is guided by the carriage 16 through a layup along the periphery of a pattern piece. Longitudinal movement of the carriage 16 and the tool 14 over a table 12 is provided by a motor-driven pinion engaging a gear rack 22 fixed to the table. Lateral movement of the tool is accomplished by moving one portion of the carriage 16 across the table relative to the remaining portion. For a more detailed description of a knife and cutting table of this type reference may be had to U.S. Pat. No. 3,495,492 issued Feb. 17, 1970 to the assignee of the present invention.

In the cutting system shown, a plurality of cutting tables 12 are positioned in side-by-side and parallel relationship with the one end of each table aligned with the other tables along the side of a pair of parallel rails 30 and 32 which extend perpendicularly to the cutting tables and are embedded in the floor on which the cutting tables are positioned. The rails 30 and 32 provide support for the transfer table 10 so that the carriage 16 and tool 14 can be transported on top of the transfer table 10 between each of the cutting tables 12.

The transfer table 10 has a rectangular base or structural frame 34 which rests on two rotatable support wheels 36 at one side and two rotatable guide wheels 38 at the other side so that one wheel is positioned under each of the four corners of the rectangular shape to roll the transfer table between the several cutting tables. It will be noted that the rail 30 and the support wheels 36 which ride on the rail 30 have a flat contact surface. On the other hand, the rail 32 and the guide wheels 38 have mating angular configurations so that the wheels 38 guide the transfer table directionally between each of the cutting tables and the wheels 36 merely support the opposite side of the cutting table. The guide wheels 38 perform an additional function described in greater detail below.

Figure 3:
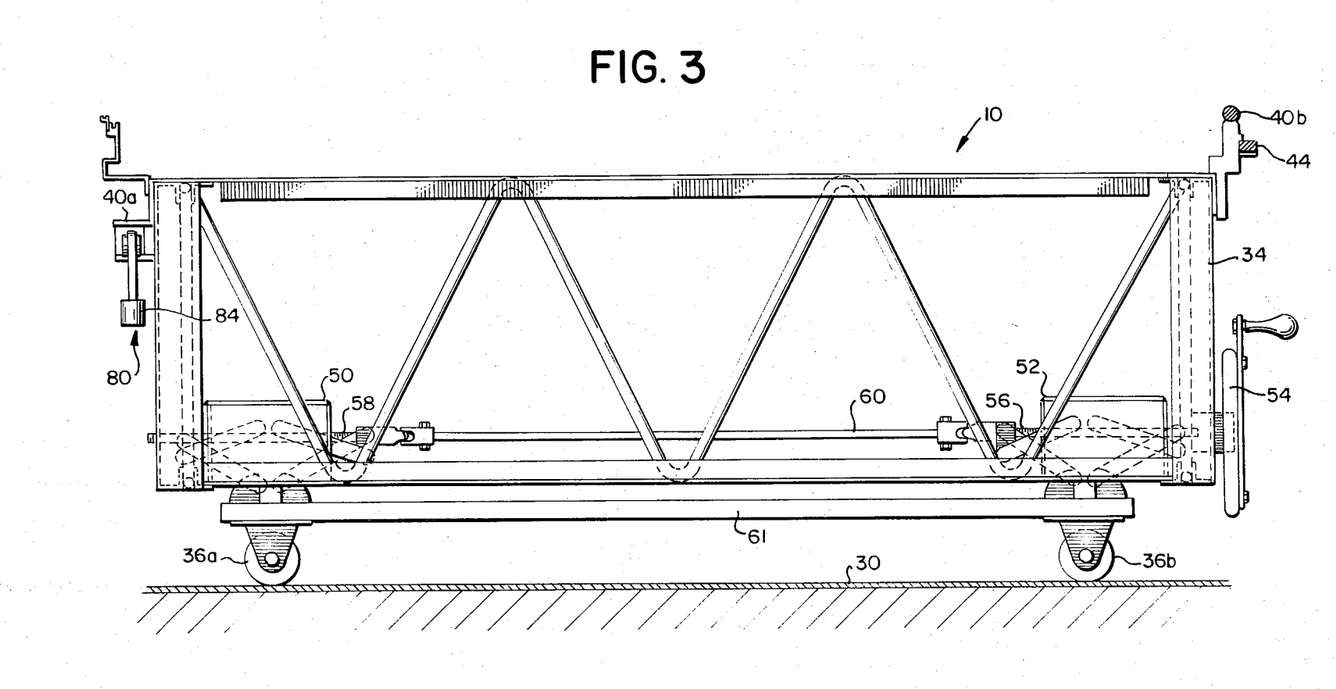
FIG. 3 is an enlarged front elevation view of the transfer table shown in FIG. 1.
Figures 4, 5:
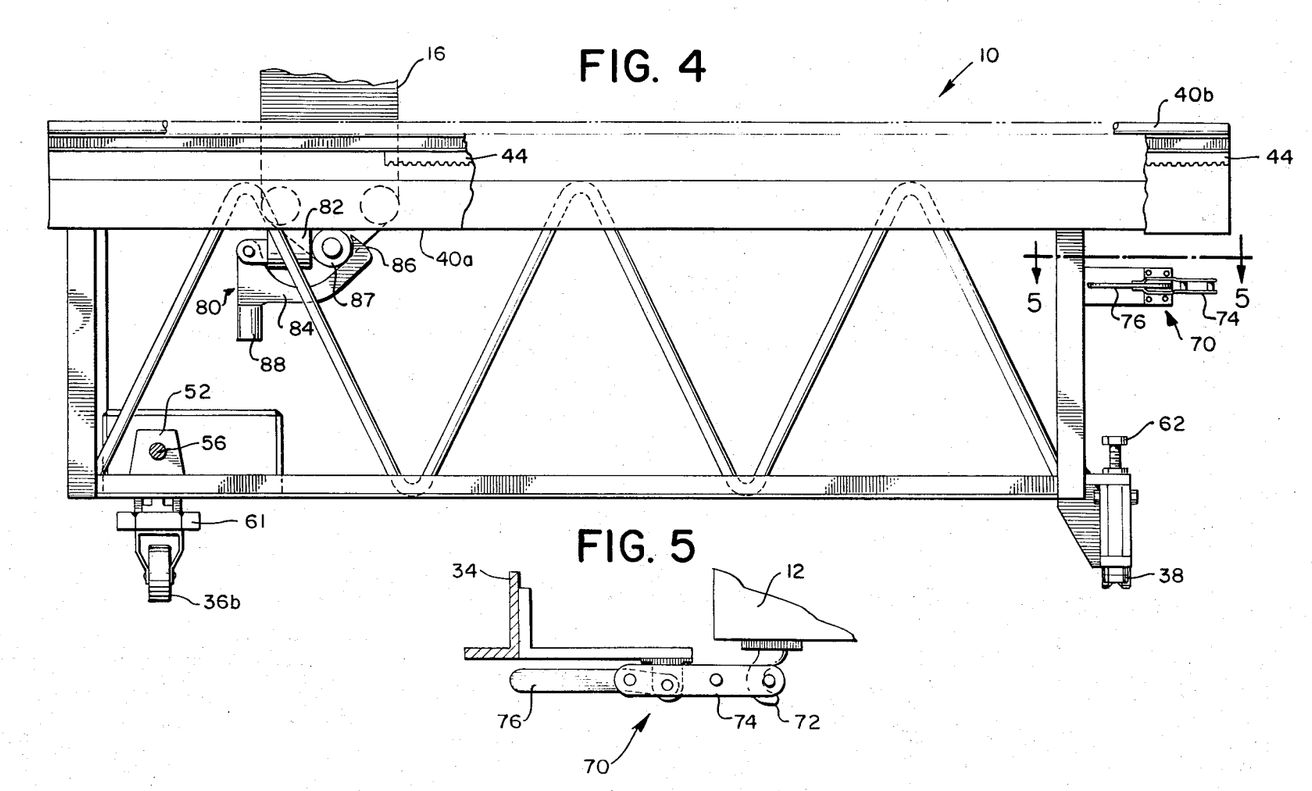
FIG. 4 is an enlarged side elevation view of the transfer table shown in FIG. 1.
FIG. 5 is a plan view of the locking handle as seen along the sectioning line 5—5 of FIG. 4.

As seen more clearly in FIGS. 3 and 4, the transfer table 10 has a pair of guide ways 40 (letter subscripts being used to distinguish between the ways) mounted in spaced and parallel relationship to the upper portion of the support frame 34. A corresponding pair of parallel guide ways 42 mounted to each cutting table 12 extend parallel to the horizontal work surface of the table 12 and support the tool 14 and tool carriage 16 as they translate over the work surface in a cutting operation. A gear rack 44 is also mounted to the frame 34 and has the same positional relationship with the way 40b as the rack 22 on the cutting table has with the way 42b so that the carriage 16 may be driven over the transfer table. When the transfer table 10 is in its transfer or loading position adjacent the end of a cutting table 12 as shown in FIG. 1, the corresponding ways 40 and 42 and the racks 42 and 44 mate in butting relationship so that the tool carriage 16 can be moved from the cutting table onto a transfer table or from the transfer table onto the cutting table. It is therefore possible to utilize the same tool 14 and tool carriage 16 with a plurality of cutting tables and to thereby increase the operational time of the control computer 18 and the cutting tool 14 while certain of the cutting tables are being set up for cutting operations and other of the cutting tables are being cleared of cut fabrics.

To facilitate movement of the tool carriage 16 onto and off of a cutting table, the transfer table must be held adjacent the end of a cutting table 12 with the ways 40 and 42 substantially aligned and in contact. To facilitate movement of the transfer table 10 on the rails 30 and 32 extending generally transverse to the cutting tables 12, the ways 40 must be separated or displaced from the ways 42 by an amount ensuring an adequate clearance for movement without interference. To this end, the transfer table 10 is provided with a pair of scissors jacks 50 and 52 for tilting the table between the loading position in which the ways 40 on the transfer table are held in a horizontal position in contact with the ways 42 of the cutting table and a travelling position in which the ways 40 are spaced from the ways 42 and substantially aligned although slightly tilted with respect to the horizontal plane. The jacks 50 and 52 are mounted at contiguous corners of the rectangular frame 34 at the one side of the table adjacent the respective wheels 36a and 36b (letter subscripts being used to distinguish the wheels 36). A manually rotatable hand wheel 54 is mounted to the lead screw 56 of the jack 52 for moving the jack between its extended and retracted position. The lead screw 58 of the jack 50 is coupled to the lead screw 56 of the jack 52 by means of a connecting shaft 60 so that rotation of the hand wheel 54 causes the jacks 50 and 52 to be extended or retracted simultaneously. By elevating or extending the jacks 50 and 52, the entire frame 34, the ways 40 and the wheels 38 pivot in the counterclockwise direction on the angular rail 32 as seen in FIG. 1. The pivoting motion brings the ways 40 and rack 44 into butting relationship with the respective ways 42 and rack 22 of the cutting table. A stabilizing bar 61 interconnects the wheels 36a and 36b to hold the wheels in aligned relationship as the jacks are operated and whenever the transfer table is moved along the rail 30. Adjusting screws 62 connected to each of the wheels 38 are utilized to set the height of the ways 40 and the rack 44 at the same elevation above the floor as the respective ways 42 and rack 22 on the cutting table. In this manner the ways 40 are made to lie in the horizontal plane with the ways 42 and form a continuous support path for moving the tool carriage 16 either off of or onto the cutting table 12. Similarly, the racks 22 and 44 form a continuous drive path between the transfer and cutting tables.

To insure that the ways 40 and 42 are brought into alignment and remain so aligned as the carriage 16 moves on or off of the transfer table 10, a pair of locking handles 70 (only one shown in FIGS. 4 and 5) are provided at opposite sides of the transfer table. Each side of a cutting table 12 adjacent the handles 70 includes a locking hook 72 (only one shown) which is engaged by the corresponding handle 70 to hold the ways 40 of the transfer table 10 in adjacent and aligned relationship with the ways 42 of the cutting table 12. The handle 70 is composed of a toggle-link 74 and a lever arm 76 connected to the link 74 to bring the link into its locking or toggle position shown in FIG. 5. If desired, alignment dowels may also be mounted to the transfer table 10 in parallel with the locking handle 70 so that the dowels pivot into corresponding engagement apertures in the cutting table 12 and bring the ways 40 and 42 into alignment as the table 10 is tilted into its loading position.

To secure the tool 14 and tool carriage 16 on the transfer table 10, an automatically actuated latch mechanism 80 in FIGS. 3 and 4 is secured to the frame 34 immediately below the guide way 40a. The latch mechanism 80 is comprised of a fixed or stationary stop block 82 and a latching arm 84 pivotally connected to the block 82. The arm 84 has a hooked end which engages a guide roller 87 on the tool carriage 16 below the way 40a when the carriage is locked on the transfer table 10. The hooked end of the arm 84 has a camming surface 86 which is struck by the guide roller 87 as the tool carriage 16 moves toward the block 82. A spring biased release handle 88 at the end of the arm 84 opposite the camming surface 86 biases the arm into its locking position and also permits the guide roller 87 to engage the camming surface 86 and pivot the arm clockwise as viewed in FIG. 4 as the guide roller moves toward the locking position adjacent the block 82. When the roller 87 is in contact with the block 82, the handle 88 rotates the hooked end of the arm 84 into the locking position illustrated so that the tool carriage 16 remains locked in the travelling position until the handle 88 is manually pulled to release the carriage. The carriage 16 is held in its travelling position indicated in FIG. 4 by both the locking mechanism 80 and by gravitational forces produced by the downhill slope of the ways 40 established when the jacks 50 and 52 tilt the transfer table 10 out of engagement with the cutting table 12. The tool carriage and tool, relatively expensive and precision components, are, therefore, well secured against rolling off of the ways 40 as the transfer table is moved between cutting tables.

Figure 6:
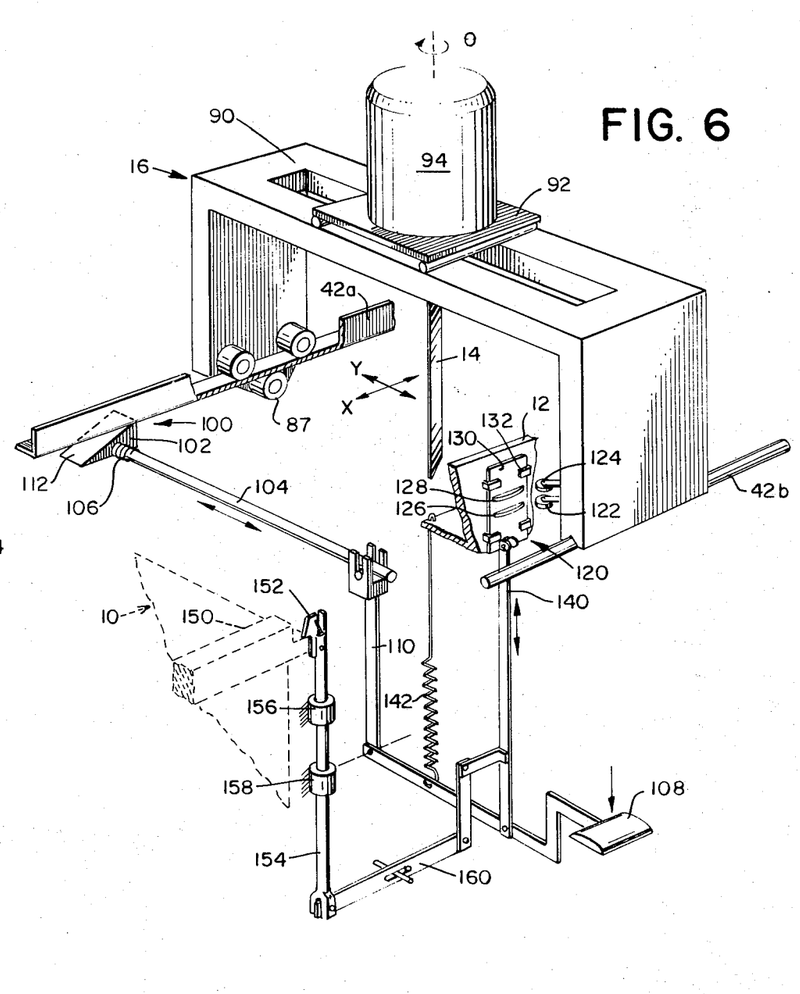
FIG. 6 is a fragmentary perspective view of the actuating linkage for overriding the mechanical and electrical limit stops on the cutting table.

In FIG. 6, the tool 14 and tool carriage 16 are illustrated schematically on the ways 42a and 42b of a cutting table 12. It will be readily understood that the carriage 16 is composed of two sub carriages, an X carriage 90 which engages the ways 42 to translate the cutting tool 14, a reciprocating knife, in the illustrated X direction and a Y carriage 92 which translates the knife in the illustrated Y direction over the X carriage 90 and the cutting table 12. A housing 94 encloses a reciprocating drive motor and also a direction motor for rotating the knife about the illustrated vertical or $\theta$ axis perpendicular to the X and Y directions so that the cutting blade is translated over the cutting table tangent to the line of cut through the layup on the work surface. The bed of the cutting table 12 is not shown in order to illustrate the mechanical and electrical limit stops which, in a cutting operation, prevent the tool carriage 16 from being driven beyond a specified limit position adjacent one end of the cutting table.

The mechanical limit stop mechanism 100 is comprised basically of a stop block 102 supported below the guide way 42a and engaged by the guide roller 87 of the tool carriage 16 when the carriage reaches the block 102 at one end of the cutting table. The block 102 is rotatably mounted on a transverse operating rod 104 and a spring 106 biases the block 102 into the stopping position shown adjacent the guide way 42a so that the tool carriage 16 cannot be inadvertently driven off of the cutting table. When it is desired to move the tool carriage off of the cutting table, an actuating mechanism including a foot pedal 108 and a bellcrank 110 is manually moved to pull the operating rod 104 and block 102 inwardly and permit the roller 87 on the carriage 16 to pass along the way 42a toward the transfer table. The block 102 contains a camming surface 112 that is engaged by the roller 87 as the tool carriage 16 moves onto the end of the cutting table from the transfer table. When the camming surface is engaged, the block 102 rotates downwardly away from the guide way 42a and permits the roller 87 and carriage 16 to move unimpeded onto the cutting table.

The electrical limit stop mechanism 120 includes a pair of limit switches 122 and 124 that engage two tripping cams 126 and 128 respectively. The cams are mounted on a slidable trip plate 130 which is secured to the cutting table frame by means of brackets 132. As the tool carriage 16 moves to the left in FIG. 6 and approaches the end of the cutting table, the roller contact of the limit switch 122 first contacts the cam 126 and the switch is tripped to stop command signals from being transmitted to the carriage 16 from the control computer 18. If the carriage continues to move toward the end of the cutting table, the roller contact of the limit switch 124 contacts the cam 128 and the switch interrupts all electrical power driving the carriage. The electrical limit switches 122 and 124 and the corresponding cams 124 and 128 are positioned along the cutting table so that the travel limit permitted by the switches is reached before the mechanical stop block 102 is contacted by the roller 87.

In order to drive the carriage 16 onto the transfer table 10, an additional link 140 in the actuating linkage is connected to the bellcrank 110 to lower the trip plate 130 and the cams 126 and 128 when the foot pedal 108 is depressed. Lowering the trip plate 130 moves the cams 126 and 128 out of registry with the roller contacts of the limit switches 122 and 124; therefore, electrical power continues to be supplied to the tool carriage 16 and it can be driven directly onto the transfer table 10.

A return spring 142 is connected between the frame of the cutting table 12 and the bellcrank 110 and biases the mechanical stop block 102 and the trip plate 130 into the operating positions which limit the travel of the tool carriage 16 on the cutting table. When the foot pedal 108 is depressed to remove the mechanical and electrical limit stops, it is necessary to hold the block 102 and trip plate 130 together with the actuating linkage in the inoperative positions against the biasing force of the spring 142. To this end, a catch 150 is secured to the transfer table 10 shown in phantom in the loading or transfer position adjacent the end of the cutting table 12 and is engaged by a tang 152 mounted on the upper end of an operating rod 154 guided vertically by bushings 156 and 158 on the cutting table 12. Whenever the pedal 108 is depressed, the operating rod 154 is elevated by a rocking link 160 connected to the link 140 and the catch 150 holds the actuating mechanism including the operating rod 104 and links 140 and 160 in the actuated position.

Figure 7:
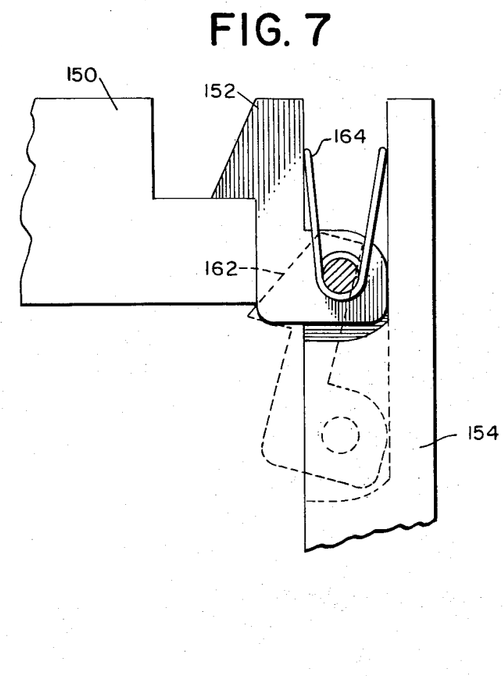
FIG. 7 is a detailed view of the catch mechanism for holding the actuating linkage of FIG. 6 in its actuated position.

As seen in detail in FIG. 7, the tang 152 has a camming surface 162 which contacts the lower side of the catch 150 as the operating rod 154 is raised by the actuating mechanism. The tang 152 is pivotally mounted to the upper end of the operating rod 154 and is biased toward an engaging position with the catch 150 by a spring 164 so that the tang moves between the phantom and solid line positions shown as the operating rod 154 moves to its upper limit. At the same time the actuating links render the stop block 102 and the cams 126 and 128 on the trip plate 130 inoperative. With the tang 152 engaged by the catch 150, the block 102 and plate 130 will be held in the inoperative positions until the transfer table 10 is tilted away from or otherwise moved from its loading position adjacent the cutting table 12. As the catch 150 draws away from the tang 152, the return spring 142 moves the block 102 and trip plate 130 back into their operative positions. When the tool carriage 16 is subsequently unloaded from the transfer table 10 onto the cutting table 12 the foot pedal 108 can again be actuated to remove the trip plate 130 from its operative relationship with the limit switches 122 and 124 and the tool carriage 16 can be driven onto the cutting table. If desired, the carriage 16 can be manually pushed onto the cutting table and it is not necessary to operate the actuating linkage since the mechanical stop block 102 merely pivots out of the path of the roller 87 as the carriage moves onto the cutting table.

As shown in FIG. 1, the cabling 20 is suspended in festoons between the control computer 18 and the tool carriage 16 by means of a system of overhead tracks. One track 170 is fixed in a horizontal position above the cutting table 12 and a plurality of cable carriers 172 connected with the cabling 20 are pulled through the track 170 by means of a tether 174 connected to the carriage 16 and the intervening spans of cabling (shown spread in the phantom position). Over the transfer table 10, the festoons of cabling rest in an inclined, movable section 178 of track so that a large segment of the cabling 20 may be carried with the tool carriage 16 when the transfer table and carriage move between the plurality of cutting tables. The movable section 178 is suspended in a fixed transverse track 180 by a track carrier 182 for movement with the transfer table. Between the control computer 18 and the movable track section 178 are several transverse tracks 184, 186, 188 and 190 from which the cabling 20 is also suspended in festoons. As shown in FIG. 2, the transverse tracks 180 and 190 and the segment of the cabling supported by the tracks 184, 186, 188 and 190 span the total distance over which the transfer table 10 carries the carriage 16 to permit the section of track 178 to be shifted between the fixed tracks over each of the cutting tables. The tracks 184, 186, and 188 span shorter distance corresponding to the distances over which the cabling segments between the respective tracks and the computer 18 are pulled. It will thus be seen that the overhead track system permits the tool carriage 16 to be translated on the transfer table 10 between the cutting tables without disconnecting and reconnecting the overhead cabling 20.

Figure 8:
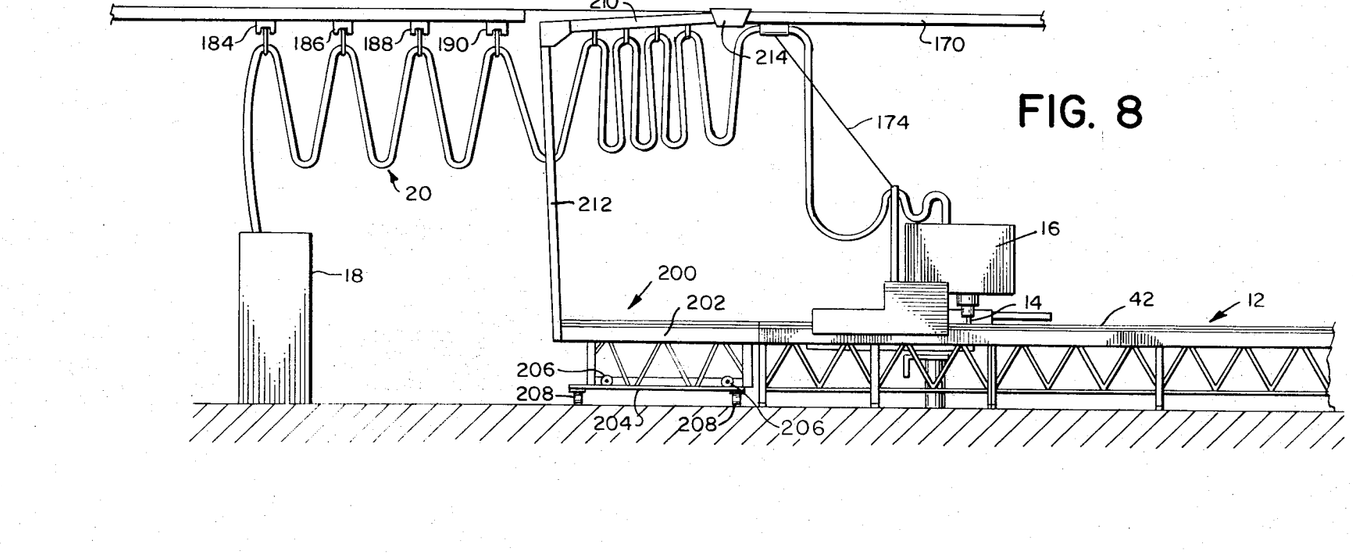
FIG. 8 is a side elevation view showing another embodiment of the transfer table in a cutting system installation.

An alternate embodiment of the transfer table of the present invention is shown in FIG. 8. In this embodiment, the transfer table generally designated 200, has a frame 202 which can be shifted in the horizontal direction toward and away from the end of the cutting table 12 to bring the ways of the two tables into and out of contact at the transfer position. The frame 202 is mounted on a chassis 204 by any convenient means for shifting the frame, such as rollers 206, or ball bearings or fluid bearings. The frame 202 and the chassis 204 have a rectangular configuration, and travel wheels 208 are located at each of the four corners of the chassis in the same manner as the wheels on the table 10 in FIGS. 1–4. The wheels 208 may ride on rails between several cutting tables as in FIGS. 1 and 2 or the wheels may simply run across the floor on which the cutting tables 12 rest. The transfer table 200 is also provided with a latch mechanism, such as the mechanism 80 shown in FIG. 4, to hold the tool carriage 16 in position on the table 200 and locking handles such as the handles 70 shown in FIG. 5 may be utilized to pull and hold the ways of the shiftable frame 202 in engagement with the ways of the cutting table at the transfer position. A catch, such as the catch 150 in FIGS. 6 and 7, can be mounted to the shiftable frame 202 to hold the electrical and mechanical limit stops on the cutting table inoperative.

The transfer table 200 is also provided with an overhead boom 210 for supporting a segment of the cabling 20 between the control computer 18 and the tool carriage 16. The overhead boom 210 has an upright post 212 connected to one side of the transfer table and is formed by a section of track through which the carriers 172 may translate. The boom 210 is at a slight inclination with respect to the horizontal overhead track 170 so that the carriers 172 fall toward the post 212 when the tool carriage 16 moves onto the transfer table 200. A flared coupling or guide 214 at the end of the track 170 receives the outer end of the boom 210 when the shiftable frame 202 is moved into the transfer or loading position adjacent the cutting table 12. When the tool carriage 16 is loaded onto the transfer table 200 and the frame 202 is shifted away from the cutting table 12, the boom 210 is pulled out of the guide 214 and the cabling supported by the boom moves together with the carriage 16 to another cutting table. The transverse tracks 184, 186, 188 and 190 allow the control computer 18 and tool carriage 16 to remain connected during the transfer operation as in the embodiment of FIG. 1.

Figure 10:
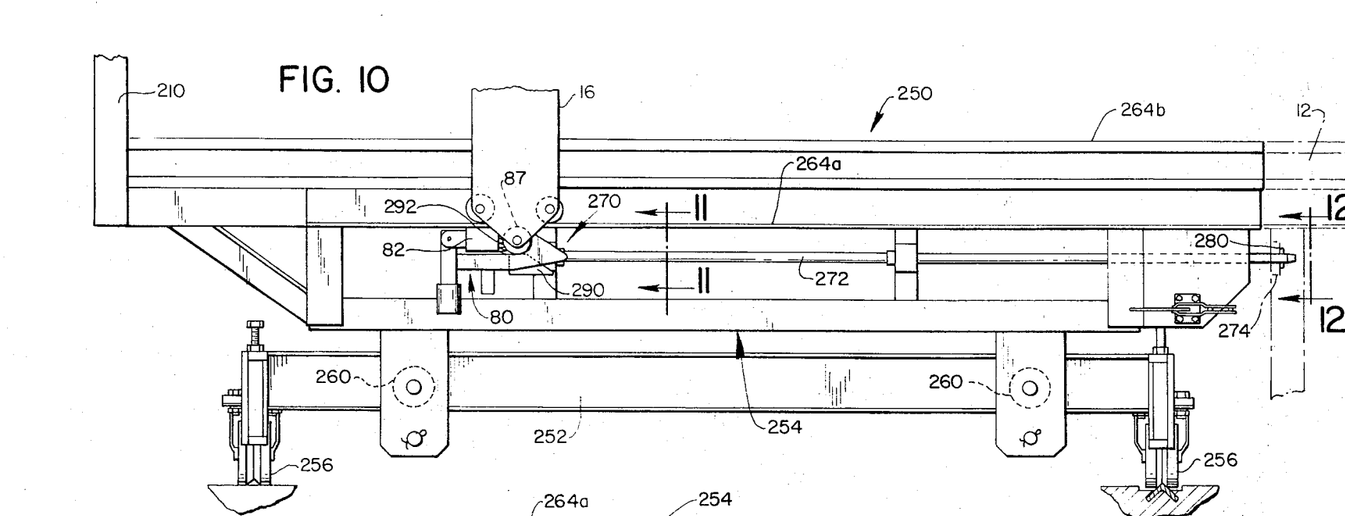
FIG. 10 is an enlarged side elevation view of a transfer table and cutting table such as shown in FIG. 8.
Figure 11:
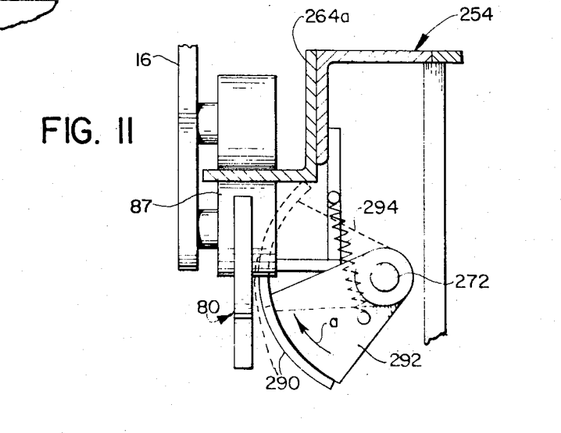
FIG. 11 is a fragmentary sectional view of the transfer table as viewed along the sectioning line 11—11 in FIG. 10.
Figure 12:
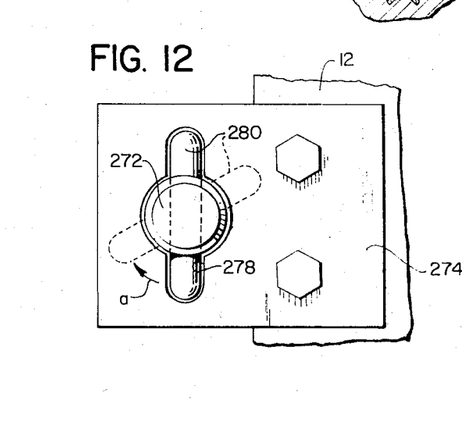
FIG. 12 is a fragmentary view of the cutting table as viewed along the sectioning line 12—12 in FIG. 10.

FIGS. 10, 11 and 12 show another transfer table 250 having a locking mechanism for locking the transfer table to the cutting table 12. The locking mechanism is automatically thrown into the locking condition whenever the tool carriage 16 (partially broken away) is not positioned entirely on the transfer table and in a loaded position suitable for travel between different cutting tables. Such locking mechanism is advantageous for several reasons. First of all, with the transfer table locked to the cutting table whenever the tool carriage is moving along the cutting table in a cutting operation, a mechanical stop on the cutting table can be eliminated and the tool carriage can not accidently be driven off the loading and unloading end of the cutting table if the electrical interlock fails. Secondly, with transfer tables having an overhead boom for supporting the control cabling between the tool carriage 16 and the computer 18, the festoons of cabling cannot be lost because the boom and overhead track remain engaged whenever the cutting and transfer tables are locked together.

The transfer table 250 is similar in construction to the transfer table 200 shown in FIG. 8 and includes a chassis or undercarriage 252 on which a shiftable frame 254 is mounted. The chassis 252 is generally rectangular in shape and has four travelling wheels 256 located adjacent each corner. The travelling wheels 256 ride on tracks which extend in a given direction generally perpendicular to the longitudinal or lengthwise dimensions of the cutting tables 12 so that the transfer table with a tool carriage mounted on it can be moved between adjacent ends of the cutting tables.

As shown and described in connection with FIG. 8, an overhead cable support boom 210 can be attached to the shiftable frame 254 to connect with the track overlying the cutting table. The control cabling between the control computer 18 and the tool carriage 16 is tied to the tool carriage and may be pulled from the boom on the transfer table into the track over the cutting table as the cutting tool 14 carries out a desired cutting operation.

The shiftable frame 254 is mounted to the chassis 252 on a set of wheels or rollers 260 which ride on L-shaped guide rails forming a portion of the chassis. The wheels 260 and the corresponding rails of the chassis permit the frame 254 to be shifted horizontally relative to the chassis 252 in a direction perpendicular to the motion of the chassis on the wheels 256. When the transfer table 250 is positioned beside one end of a cutting table 12, the frame 254 can be moved in and out of abutment with the cutting table to permit the carriage to be rolled on and off the cutting table and to provide clearance between the tables.

As with the cutting tables 10 and 200 in FIGS. 1 and 8, the cutting table 250 includes guide ways 264a and 264b which have the same shape as the guide ways on the cutting table and are mounted on the frame 254 in spaced relationship to register in continuous and aligned relationship with the guide ways of the cutting table when the cutting table is located in the transfer position immediately adjacent the end of a cutting table 12. For purposes of clarity in showing the locking mechanism, the way 264a, the mating portion of the carriage and the latch mechanism 80 are shown on the near side of the table in FIG. 10 while the corresponding parts in FIGS. 4 and 8 are shown on the far side.

To prevent a tool carriage from accidentally dropping off of either the transfer table 250 or the cutting table 12 and also to prevent the control cabling from dropping out of the support boom or overhead track, a locking mechanism, generally designated 270, is mounted to the shiftable frame 254 and engages the adjacent end of the cutting table 12. The locking mechanism 270 is designed to join the transfer table 250 and cutting table 12 in locked relationship whenever the tool carriage 16 is displaced from its captured or latched position on the transfer table 250. A latch mechanism 80, the same as that shown and described in FIGS. 3 and 4, engages the tool carriage 16 only when the carriage is moved into abutment with the stop block 82 and holds the carriage in the latched position as the transfer table travels between adjacent cutting tables. When the latch mechanism 80 is released and the tool carriage 16 is displaced from the latched position, the locking mechanism 270 is automatically actuated to positively lock the transfer table to the cutting table. The two tables as well as the overhead boom and cable track remain locked together until the carriage 16 returns to the latched position for travelling between the cutting tables.

The components of the locking mechanism 270 include a locking shaft 272 rotatably mounted on the frame 254 and an apertured locking plate 274 fixedly attached to the cutting table 12 and engagable with the shaft 272. The shaft 272 extends in the same direction in which the frame 254 is shifted relative to the chassis 252 and is journaled to prevent movement relative to the frame in that direction. The locking plate 274 as shown more clearly in FIG. 12 is mounted to the cutting plate so that it mates with the shaft 272 when the transfer table 250 is positioned in the transfer position adjacent the end of the cutting table 12. The locking plate 274 contains a keyhole aperture 278 which receives the shaft 274 and a lock pin 280 in the end of the shaft when the pin is properly oriented with respect to the aperture 278. The shaft 272 and pin 280 pass through the aperture 278 when the frame 254 is shifted into abutment with the cutting table prior to transferring the tool carriage from the transfer table onto the cutting table. By rotating the shaft in the aperture 278, the lock pin 280 is rotated to the phantom position indicated in FIG. 12 and prevents the frame 254 of the transfer table from shifting away from the cutting table and producing a gap between the abutted guide ways. The locked shaft 272 and plate 274 also prevent the transfer table from rolling on the chassis wheels 256 to displace the guide ways of the two tables from their aligned relationship. Once the shaft 272 and the plate 274 are locked, the guide ways on the two tables remain in continuous and aligned relationship and the cable support boom and the overhead track remain coupled since their positional relationship is governed by the positioning of the transfer table 250 and cutting table 12.

The actuating mechanism which causes the locking mechanism 270 to move between locked and unlocked conditions with movements of the carriage 16 includes a displaceable cam 290 fixed on the shaft 272 at a position adjacent the lower side of the guide way 264a on which the tool carriage 16 rides at one side of the transfer table. The cam 290 is cylindrical as best seen in FIG. 11 and is connected by means of the radial standoff 292 to rotate the shaft 272. The cam is provided with a camming surface having a generally helical portion and a flat portion which are contacted by the guide roller or wheel 87 on the tool carriage adjacent the lower side of the way 264a. A biasing spring 294 connects between the standoff 292 and the frame 254 to pull the cam toward the way 264a.

When the tool carriage 16 is released from the latch mechanism 80 and is pushed or driven toward a cutting table, the guide wheel 87 moves off of the flat portion of the camming surface and over the helical portion and allows the cam 290 and the shaft 272 to rotate under the influence of the biasing spring 294 as indicated by the arrow a in FIGS. 11 and 12. Rotation of the shaft 272 causes the lock pin 280 to be rotated into the phantom position shown in FIG. 12 which locks the transfer table to the cutting table as described above.

When the tool carriage 16 returns from the cutting table 12 onto the transfer table 250, the locking mechanism 270 holds the transfer table to the cutting table until the carriage has reached its latched position. As the guide wheel 87 moves along the guide way 264a toward the latched position, the wheel engages the helical portion of the camming surface and rotates the cam 290 against the biasing force of spring 294. When the wheel reaches the flat portion of the camming surface, the lock pin 280 has been rotated into aligned relationship with the oblong portion of the keyhole aperture 278 in the lock plate 274. The transfer table 250 is then unlocked from the cutting table and is free to be shifted away from the cutting table and to be moved toward another cutting table.

When a boom is attached to the shiftable frame 254, the tether 174 shown in FIGS. 1 and 2 is selected to have a length which will cause the control cabling to be drawn entirely onto the track portion of the boom whenever the tool carriage 16 is moved into its latched position on the transfer table. Therefore, if the tool carriage 16 is in its latched position on the transfer table, no portion of the control cabling will be suspended from the tracks overlying the cutting table. Conversely, whenever a portion of the cabling is suspended from the tracks overlying the cutting table, the carriage 16 will be out of the latched position and the cutting and transfer tables and the boom and track will be locked together.

Figure 9:
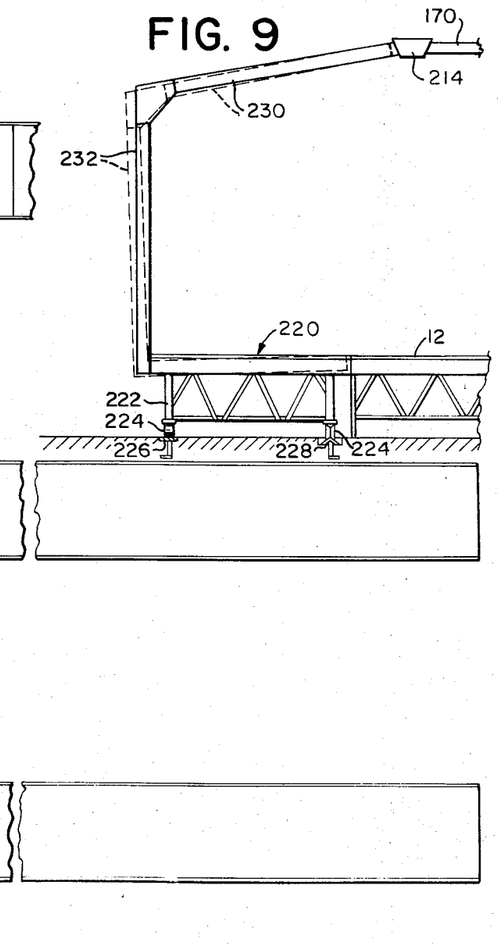
FIG. 9 is a side elevation view showing another embodiment of the transfer table.

While the present invention has been described in several preferred embodiments it will be readily understood that numerous modifications and substitutions can be had without departing from the spirit of the invention. For example, although the boom 210 is shown supported from the transfer table 200 having a shiftable frame, it is readily apparent that the boom could also be mounted on a tilting transfer table such as shown in FIG. 9. In FIG. 9, the transfer table 220 has a rectangular, tilting frame 222 having the same construction as the tilting frame 34 in FIGS. 1, 3 and 4. The frame 222 is also mounted on wheels 224 which travel on tracks 226 and 228 extending between the cutting tables 12. A cable support boom 230 including the upright post 232 has the same construction as the boom 210 and is connected to the frame 222 for tilting movement with the frame between the transfer position in contact with the table and the travel position disengaged from the table and indicated in phantom. It will be noted that the tilting motion of the frame 222 not only disengages the transfer and cutting tables but also disengages the boom 230 and the guide 214 on the overhead track 170 so that the transfer table with the boom can move toward other cutting tables without impedance. Similarly, the transfer table 200 in FIG. 8 having the shiftable frame 202 can be utilized without the boom 210 in cutting system installations such as shown in FIG. 1. The number of cutting tables 12 served by a single transfer table can be varied depending upon the set up and clearing times associated with the particular fabrics and cutting processes being performed. It is also readily apparent that the transfer table can be utilized in systems other than those which cut layups of fabrics. In general the transfer table can be used with any type of tool carriage that can be interchanged between several different work tables. Accordingly, the present invention has been described in several preferred embodiments by way of illustration rather than limitation.

We claim:

1. A transfer table for moving a tool carriage between a plurality of work tables having ways on which the tool carriage moves along the respective work tables while performing a work operation comprising: a support frame; a set of supporting ways mounted to the support frame and corresponding respectively with the ways of the work table; a set of rotatable wheels supporting the frame and the ways mounted on the frame for rolling movement toward a position in which the corresponding ways of the transfer table and the work table are spaced from one another and substantially aligned; and means connected to the support frame for moving the ways on the frame from said position into engagement with the ways of the work table without further rolling movement of the support frame on the set of wheels.

2. A transfer table as defined in claim 1 wherein the means comprises jack means connected to the support frame for tilting the frame and shifting the ways of the frame toward engagement with the ways of the work table.

3. A transfer table as defined in claim 1 wherein the means comprises shifting means for shifting the frame and the ways on the frame relative to the set of wheels.

4. A transfer table for carrying a tool carriage from a work table having ways on which the carriage moves in a work operation comprising: a structural frame; a set of ways corresponding with the ways of the work table mounted in spaced relationship on the structural frame and extending to the periphery of the frame for registration in a continuous manner with the ways of the work table; a set of support wheels connected with the frame for moving the frame; and jacking means connected to the support frame for tilting the ways between a loading position and a traveling position.

5. A transfer table as defined in claim 4 for carrying a motor-driven tool carriage further including an overhead cable support boom connected with the structural frame for tilting movement with the ways between the loading and traveling positions.

6. A transfer table as defined in claim 4 wherein the set of ways are fixedly mounted to the support frame; and the jack means is interposed between the wheels and the support frame at one side of the table.

7. A transfer table as defined in claim 6 wherein: the frame has a generally rectangular base; the set of support wheels includes at least four wheels respectively supporting the four corners of the rectangular base; and the jack means is interposed between the base and two of the four support wheels at contiguous corners of the rectangular base.

8. A transfer table as defined in claim 7 wherein the set of ways mounted on the frame comprises two parallel ways extending in generally perpendicular relationship to the side of the rectangular base supported by said two of the four support wheels.

9. A transfer table for carrying a tool carriage as defined in claim 4 further including a mechanical latch mounted on the support frame and engageable with the tool carriage to lock the carriage in a fixed position on the support frame.

10. A transfer table as defined in claim 9 wherein the mechanical latch has a cam actuating surface engaged by the carriage adjacent the fixed position.

11. In an automated tool system having a work table and a tool and tool carriage automatically controlled to cause the tool and tool carriage to travel over parallel ways on the work table in a work operation, a transfer table comprising: a mobile chassis; a structural frame mounted to the mobile chassis and variably positionable relative to the chassis; and a set of parallel ways connected with the structural frame in a spaced relationship corresponding with the spacing of the parallel ways on the work table.

12. The transfer table in the automated tool system as defined in claim 11 wherein the structural frame variably positionable on the chassis is shiftably mounted on the chassis for shifting movement in a direction parallel to the set of ways connected with the frame.

13. The combination comprising: a tool; a work table having a work surface for supporting a material in a position to be worked upon by the tool; a tool carriage interposed between the tool and the work table and supporting the tool for movement relative to the work surface of the work table; control means connected with the tool and the carriage for controlling the operation and movement of the tool and carriage relative to the work surface; a limit stop mounted to the work table and movable between a first position at which the stop prevents further movement of the carriage and tool in one direction relative to the table and a second position at which the stop permits further movement of the carriage and the tool in the one direction; actuating means connected to the limit stop for moving the limit stop between the first and second positions; a transfer table having a frame and carriage supports for the tool carriage and engageable in a loading position with the work table whereby the carriage and the tool may be loaded onto the carriage supports from the work table; and means mounted to the transfer table for engaging the actuating means in the loading position of the transfer table and holding the limit stop in the second position.

14. The combination defined in claim 13 wherein the control means includes electrical control means; the limit stop in an electrical limit stop comprising a tripping cam and an electrical limit switch electrically connected to the electrical control means and cooperable with the tripping cam at the first position of the electrical limit stop to disconnect the electrical control means and stop carriage movement.

15. The combination as defined in claim 14 wherein a mechanical limit stop is also mounted to the work table and movable between a first position in which the mechanical limit stop engages the carriage to stop further movement in one direction and a second position permitting further movement in the one direction; and the actuating means is also connected to the mechanical limit stop for moving the mechanical limit stop between the first and second positions together with the movement of the electrical limit stop between the first and second positions respectively.

16. A combination as defined in claim 13 wherein the actuating means comprises a manually operable actuating linkage connected to the limit stop.

17. The combination defined in claim 13 wherein the limit stop is a mechanical limit stop.

18. A combination comprising: a work tool; a work table for supporting material to be worked upon by the tool; electrically driven carriage means interposed between the tool and the work table and supporting the tool for movement over the work table; electrical control means connecting with the carriage means for controlling the driving movement of the carriage means over the work table; electrical limiting means connected to the electrical control means and cooperating with the carriage means for interrupting the driving movement of the carriage means over the work table at a travel limit on the work table; actuating means connected to the electrical limiting means for selectively rendering the electrical limiting means ineffective; a transfer table having a frame and carriage supports and having a transfer position adjacent the work table at which the carriage means and tool may be transferred onto the carriage supports of the transfer table from the work table; and means mounted to the transfer table for engaging the actuating means at the transfer position adjacent the work table and causing the actuating means to hold the electrical limiting means inoperative.

19. A combination as defined in claim 18 further including mechanical limit stop means mounted to the work table and cooperating with the carriage means to physically limit the movement of the carriage means over the table; and wherein the actuating means is also connected to the mechanical limit stop means for rendering the limit stop means inoperative whenever the electrical limiting means is inoperative.

20. The combination in an automated cutting system comprising: a plurality of cutting tables located in spaced relationship, each cutting table defining a work surface for supporting material to be cut; a cutter; a carriage supporting the cutter and having controlled drive means engagable with each of the cutting tables for moving the carriage and the cutter on the tables; a control computer providing command signals defining patterns to be cut in the material supported by the cutting tables; cabling interconnecting the control computer and the carriage for transmitting the command signals from the computer to the carriage; suspension means connected with the cabling for supporting the cabling between the control computer and the carriage as the carriage moves on the cutting tables; mobile transfer means for supporting and moving the carriage and the cutter between the spaced cutting tables; and a cable support connected to and movable with the mobile transfer means whereby the cutter, the carriage and at least a portion of the cabling can be transferred together between cutting tables.

21. The combination defined in claim 20 wherein the mobile transfer means comprises a table mounted on wheels; and the cable support includes a boom supported above the table.

22. The combination defined in claim 20 wherein the suspension means includes a first set of overhead tracks extending over the work surfaces of the cutting tables, a second set of overhead tracks located generally between the control computer and the tracks of the first set; and carriers suspending the cabling in festoons from the sets of tracks; and wherein the cable support includes a boom means engagable with the overhead tracks of the first set to receive and transfer cabling supported by the carriers above the cutting tables.

23. The combination of claim 22 wherein: the movable transfer means comprises a transfer table tiltable at each of the cutting tables between a loading position in contact with the cutting table and a traveling position disengaged from the cutting table; and the boom means is connected to the transfer table to tilt with the transfer table into engagement with the overhead track extending above the cutting table at the loading position of the transfer table to receive the carriers in the track.

24. The combination defined in claim 20 wherein the mobile transfer means includes a movable table on wheels; and a fixed rail on which at least two of the table wheels ride, the rail extending adjacent the plurality of cutting tables.

25. The combination defined in claim 24 wherein jacking means are connected to the table for tilting the table about the rail on which two of the wheels ride.

26. In a tool system, the combination comprising a tool carriage; a tool mounted on the carriage; a work table having a work surface and carriage guide ways mating with the tool carriage and on which the tool carriage is guided relative to the work surface in a work operation; a transfer table movable into and out of a transfer position adjacent the work table for carrying the tool and tool carriage and also having carriage guide ways mating with the tool carriage and mounted to register in continuous and aligned relationship with the guide ways of the work table with the transfer table in the transfer position; locking means having locked and unlocked conditions and connected to the two tables for locking the transfer table in the transfer position to the work table; and lock actuating means operated by the positioning of the tool carriage on the transfer table for actuating the locking means between the locked and unlocked conditions.

27. In a tool system, the combination of claim 26 wherein the tool carriage fits entirely on the guide ways of the transfer table in a loaded position; and the lock actuating means includes a carriage member which at the loaded position of the carriage holds the locking means in the unlocked condition.

28. In a tool system, the combination of claim 27 wherein the lock actuating means includes a displaceable cam mounted adjacent one of the guide ways on the transfer table; and the carriage member is a carriage wheel which travels along the one of the guide ways and displaces the cam at the loaded position of the carriage.

29. In a tool system, the combination of claim 26 wherein the transfer table includes a chassis having wheels for travelling in a first direction and a frame shiftable in a second direction perpendicular to the first direction relative to the chassis toward and away from the work table, the guide ways being mounted on the transfer table parallel to the second direction; and the locking means comprises an apertured lock plate on the work table and a shaft mounted to the shiftable frame and extending in the second direction into the apertured lock plate at the transfer position of the transfer table, the shaft being rotatable within the lock plate between a locked and unlocked position.

* * * * *